US009171418B2

(12) United States Patent
Loose et al.

(10) Patent No.: US 9,171,418 B2
(45) Date of Patent: Oct. 27, 2015

(54) GAMING DEVICES AND GAMING SYSTEMS WITH MULTIPLE DISPLAY DEVICE ARRANGEMENT

(71) Applicant: WMS Gaming Inc., Waukegan, IL (US)

(72) Inventors: Timothy C. Loose, Chicago, IL (US); Paul M. Lesley, Blue Island, IL (US); Christopher W. Chudek, Evanston, IL (US)

(73) Assignee: Bally Gaming, Inc., Las Vegas, NV (US)

(*) Notice: Subject to any disclaimer, the term of this patent is extended or adjusted under 35 U.S.C. 154(b) by 306 days.

(21) Appl. No.: 13/683,353

(22) Filed: Nov. 21, 2012

(65) Prior Publication Data

US 2013/0157751 A1 Jun. 20, 2013

Related U.S. Application Data

(60) Provisional application No. 61/570,913, filed on Dec. 15, 2011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC .................................. *G07F 17/3211* (2013.01)

(58) Field of Classification Search

USPC .................................... 463/20, 22, 25, 30, 42

See application file for complete search history.

(56) References Cited

U.S. PATENT DOCUMENTS

| | | | |
|---|---|---|---|
| 1,167,653 | A | 1/1916 | Nielsen |
| 4,885,663 | A | 12/1989 | Parker |
| 4,907,132 | A | 3/1990 | Parker |
| 5,005,108 | A | 4/1991 | Pristash et al. |
| 5,042,900 | A | 8/1991 | Parker |
| 5,513,851 | A | 5/1996 | Harris |
| 5,537,290 | A | 7/1996 | Brown et al. |
| 5,568,964 | A | 10/1996 | Parker et al. |
| 5,732,948 | A | 3/1998 | Yoseloff |
| 5,765,797 | A | 6/1998 | Greene et al. |
| RE35,864 | E | 7/1998 | Weingardt |
| 5,806,847 | A | 9/1998 | White et al. |

(Continued)

FOREIGN PATENT DOCUMENTS

| | | |
|---|---|---|
| DE | 4211311 | 10/1993 |

*Primary Examiner* — Adetokunbo O Torimiro

(74) *Attorney, Agent, or Firm* — Nixon Peabody LLP

(57) ABSTRACT

Gaming systems, gaming terminals, and multi-display arrangements for a wagering game terminal are presented herein. A gaming system for conducting a wagering game is disclosed which includes at least one input device, at least one processor, first and second electronic display devices, and an electronic display-transition device. The first and second electronic display devices are mounted in side-by-side, non-coplanar relationship and spaced a gap apart from each other. Each of the display devices is configured to dynamically display aspects of the wagering game. The electronic display-transition device extends across the gap from the first electronic display device to the second electronic display device. The electronic display-transition device is also configured to dynamically display aspects of the wagering game. The electronic display-transition device can have a curvilinear cross-sectional profile and/or a flexible display screen.

28 Claims, 6 Drawing Sheets

(56) References Cited

U.S. PATENT DOCUMENTS

| | | | |
|---|---|---|---|
| 5,924,926 | A | 7/1999 | Brown |
| 5,961,119 | A | 10/1999 | Brown |
| 6,062,563 | A | 5/2000 | De Keller |
| 6,079,838 | A | 6/2000 | Parker et al. |
| 6,120,377 | A | 9/2000 | McGinnis, Sr. et al. |
| 6,123,335 | A | 9/2000 | Adkins |
| 6,134,103 | A | 10/2000 | Ghanma |
| 6,158,867 | A | 12/2000 | Parker et al. |
| 6,213,876 | B1 | 4/2001 | Moore, Jr. |
| 6,234,482 | B1 | 5/2001 | Henderson |
| 6,270,411 | B1 | 8/2001 | Gura et al. |
| 6,273,423 | B1 | 8/2001 | Promutico |
| 6,286,834 | B1 | 9/2001 | Caputo |
| 6,315,666 | B1 | 11/2001 | Masera et al. |
| 6,336,633 | B1 | 1/2002 | Webb |
| 6,378,869 | B1 | 4/2002 | Hedge, Jr. et al. |
| 6,508,469 | B2 | 1/2003 | Promutico |
| 6,508,707 | B2 | 1/2003 | DeMar et al. |
| 6,646,695 | B1 | 11/2003 | Gauselmann |
| 6,761,353 | B2 | 7/2004 | Berman et al. |
| 6,776,413 | B2 | 8/2004 | Brown, III |
| 6,854,732 | B2 | 2/2005 | Moody |
| 6,861,600 | B1 | 3/2005 | Schulz et al. |
| 6,874,925 | B2 | 4/2005 | Page et al. |
| 6,896,264 | B1 | 5/2005 | Haber |
| 6,910,783 | B2 | 6/2005 | Mezei et al. |
| 7,137,884 | B2 | 11/2006 | Gilmore |
| 7,195,560 | B2 | 3/2007 | DeMar et al. |
| 7,217,021 | B2 | 5/2007 | Lee |
| 7,305,163 | B2 | 12/2007 | Williams |
| 7,387,572 | B2 | 6/2008 | Hanchar |
| 7,438,641 | B2 | 10/2008 | Hedrick |
| 7,513,830 | B2 | 4/2009 | Hajder et al. |
| 7,540,806 | B2 | 6/2009 | Tastad |
| 7,566,269 | B2 | 7/2009 | B-Jensen et al. |
| 7,594,852 | B2 | 9/2009 | Rasmussen |
| 7,611,408 | B2 | 11/2009 | Martin |
| 7,775,888 | B2 | 8/2010 | Wudtke |
| 7,780,534 | B2 | 8/2010 | Wudtke |
| 2002/0031316 | A1 | 3/2002 | Lowry |
| 2003/0060269 | A1 | 3/2003 | Paulsen et al. |
| 2004/0053658 | A1 | 3/2004 | Rothranz |
| 2004/0147300 | A1 | 7/2004 | Seelig et al. |
| 2004/0248647 | A1 | 12/2004 | Rothschild et al. |
| 2004/0248648 | A1 | 12/2004 | Rothschild et al. |
| 2005/0020348 | A1 | 1/2005 | Thomas et al. |
| 2005/0049028 | A1 | 3/2005 | Gomez et al. |
| 2005/0197181 | A1 | 9/2005 | Jaffe |
| 2006/0014580 | A1 | 1/2006 | Hawthorn |
| 2006/0160598 | A1 | 7/2006 | Wells et al. |
| 2006/0183544 | A1 | 8/2006 | Okada |
| 2006/0277805 | A1 | 12/2006 | Kopera et al. |
| 2007/0021183 | A1 | 1/2007 | Fiden et al. |
| 2007/0111776 | A1 | 5/2007 | Griswold et al. |
| 2007/0259706 | A1 | 11/2007 | Anderson et al. |
| 2008/0113821 | A1 | 5/2008 | Beadell et al. |
| 2008/0227526 | A1 | 9/2008 | Crossman et al. |
| 2009/0036197 | A1 | 2/2009 | Anderson et al. |
| 2009/0124339 | A1 * | 5/2009 | Barton et al. .................. 463/20 |
| 2009/0137311 | A1 | 5/2009 | Iverson et al. |
| 2009/0191965 | A1 | 7/2009 | Dixon |
| 2009/0325692 | A1 | 12/2009 | Klostermann et al. |
| 2010/0048288 | A1 * | 2/2010 | Canterbury et al. ............ 463/20 |
| 2010/0210354 | A1 | 8/2010 | Burak et al. |
| 2010/0317433 | A1 | 12/2010 | Ansari et al. |
| 2011/0003630 | A1 | 1/2011 | Rasmussen et al. |
| 2011/0255300 | A1 | 10/2011 | Porter et al. |

* cited by examiner

GAMING DEVICES AND GAMING SYSTEMS WITH MULTIPLE DISPLAY DEVICE ARRANGEMENT

CROSS-REFERENCE TO RELATED APPLICATION

This application claims the benefit of U.S. Provisional Application No. 61/570,913, filed Dec. 15, 2011, which is hereby incorporated by reference in its entirety.

COPYRIGHT

A portion of the disclosure of this patent document contains material which is subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, wagering game terminals, and gaming systems, and more particularly to gaming devices and gaming systems with multiple display device arrangements.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously strive to develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "primary" or "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Wagering games may additionally award players with "progressive jackpot" awards that are funded, at least in part, by a percentage of coin-in from the gaming machine or a plurality of participating gaming machines.

Another way to increase the entertainment value of a wagering game is to enhance the display features associated with the gaming system and/or individual gaming machines. Many gaming machines include a variety of visual attractions and displays, such as models, signs, and other forms of information. These items typically include fixed permanently-printed glass, video displays, artwork, models, and/or marquees. In many gaming regions, industry regulations in fact require each gaming terminal to include top-box mounted lighting and signage that indicate, for example, the class of machine, when the machine is out of funds, when the machine is malfunctioning, etc. For gaming machines with electronic video displays, improvements in video technology, such as liquid crystal display (LCD) panels, plasma display panels, and light emitting diode (LED) displays, have enabled the display of richer and more colorful graphics.

Historically, each gaming machine is limited to a primary display device and a dedicated top box display arrangement with a top-box mounted display device or marquee assembly. In most configurations, the gaming terminal's primary and top-box graphical display devices are rigidly mounted to the cabinet, juxtaposed one on top of the other in a generally parallel, often coplanar layout. The transition area of the gaming terminal between the two graphical display devices is often unused "dead" space or bears permanently-printed graphics. New developments in graphical displays, including those that eliminate "dead" space in multi-display arrangements, can further enhance player appeal and thus increase game play and player loyalty.

SUMMARY

According to one aspect of the present disclosure, a gaming system for conducting a wagering game is disclosed. The gaming system includes at least one input device and at least one processor. The gaming system also includes first and second electronic display devices that are mounted side-by-side (e.g., vertically, horizontally, etc.) in non-coplanar relationship to one another. The electronic display devices are also spaced a gap apart from each other. Each of the electronic display devices is configured to dynamically display aspects of the wagering game. An electronic display-transition device extends across the gap from the first electronic display device to the second electronic display device. The electronic display-transition device is also configured to dynamically display aspects of the wagering game.

According to other aspects of the present disclosure, a gaming system for conducting a wagering game is presented. The gaming system includes at least one input device configured to receive an indication of a wager to play a wagering game, at least one processor, and at least one memory device storing instructions which, when executed by the at least one processor, cause the gaming system to execute a wagering game. The gaming system also includes first and second electronic display devices, each of which includes a respective video display screen configured to dynamically display aspects of the executed wagering game. The first and second electronic display devices are mounted in side-by-side (e.g., vertically, horizontally, etc.) non-coplanar relationship and spaced a gap apart from each other. An electronic display-transition device extends across the gap from the first electronic display device to the second electronic display device. The electronic display-transition device has a curvilinear video display screen that is configured to dynamically display aspects of the wagering game and visually connect the first and second video display screens.

According to another aspect of the disclosure, a gaming terminal for playing a wagering game is featured. The gaming terminal includes a cabinet, a wager input device configured to receive an indication of a wager to play the wagering game, and a player input device configured to receive a player input related to play of the wagering game. The gaming terminal also includes a first electronic display device that is mounted to the cabinet at a first location. The first electronic display device has a first video display screen that is configured to dynamically display aspects of the wagering game. A second electronic display device is mounted to the cabinet at a second location and at an oblique angle to and spaced a gap apart from the first electronic display device. The second electronic display device includes a second video display screen that is configured to dynamically display aspects of the wagering game. An electronic display-transition device covers and extends across the gap from the first electronic display device to the second electronic display device. The electronic display-transition device has a curvilinear third video display screen that is configured to dynamically display aspects of the wagering game.

Yet another aspect of this disclosure presents a multi-display arrangement for a wagering game terminal. The multi-display arrangement includes first and second electronic display devices, and an electronic display-transition device extending therebetween. The first electronic display device is configured to mount to the cabinet of the game terminal at a first location. The first electronic display device has a first video display screen that is configured to dynamically display aspects of a wagering game. The second electronic display device is configured to mount to the cabinet in a generally vertical orientation at a second location and at an oblique angle to and vertically spaced a gap apart from the first electronic display device. The second electronic display device has a second video display screen configured to dynamically display aspects of the wagering game. The electronic display-transition device covers and extends across the gap between the first and second electronic display devices. The electronic display-transition device has a curvilinear display screen that is configured to dynamically display aspects of the wagering game.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and best modes for carrying out the present invention when taken in connection with the accompanying drawings and the appended claims.

Figure 1:
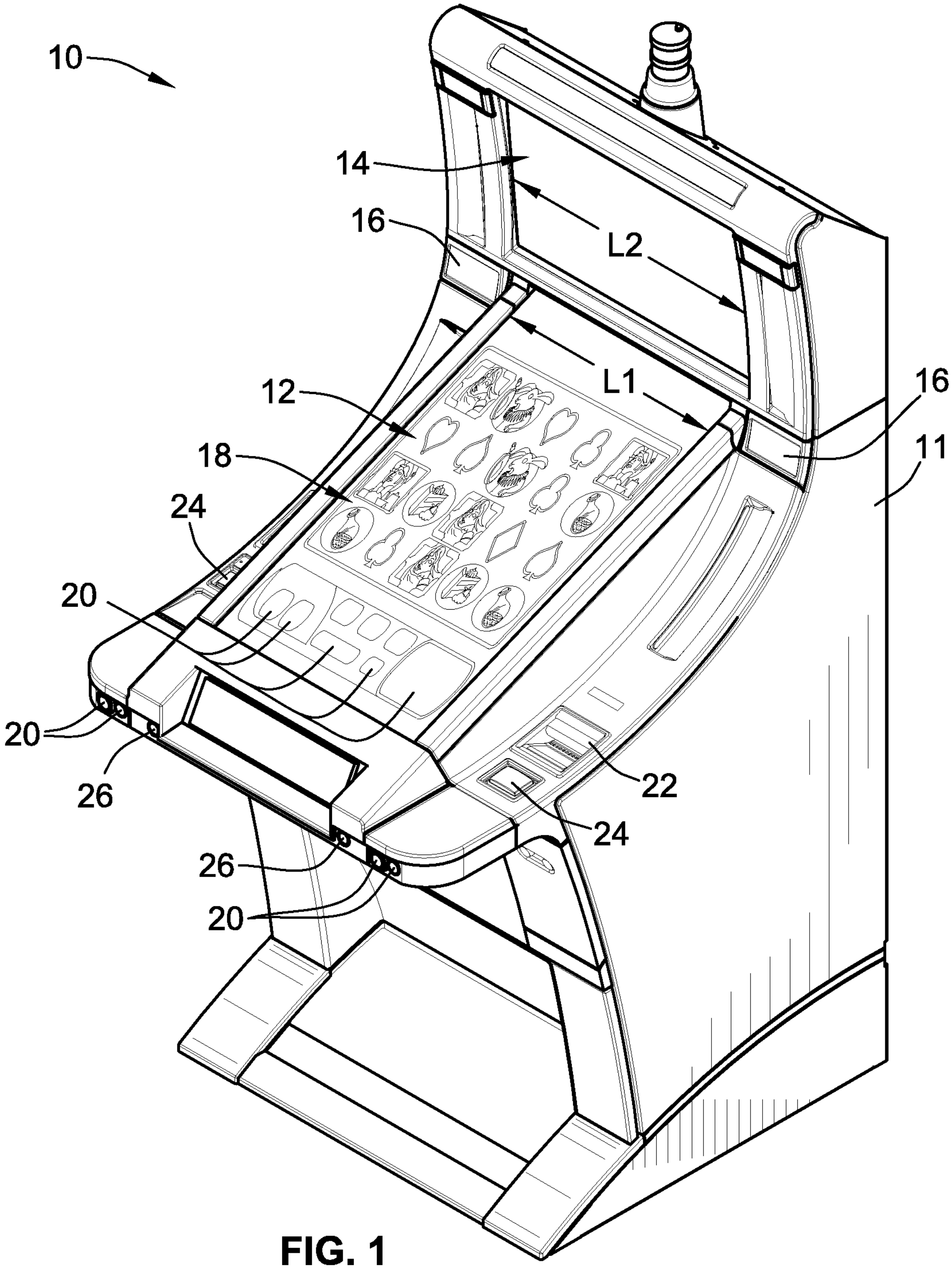
FIG. 1 is a perspective-view illustration of an exemplary free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred and exemplary embodiments of the invention with the understanding that the present disclosure is to be considered as an exemplification of the principles of the invention and is not intended to limit the broad aspect of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, the singular includes the plural and vice versa (unless specifically disclaimed); the words "and" and "or" shall be both conjunctive and disjunctive (unless specifically disclaimed); the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, U.S. Patent Application Publication Nos. 2010/0062196 and 2010/0234099, and International Application No. PCT/US2007/000792, all of which are incorporated herein by reference in their respective entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
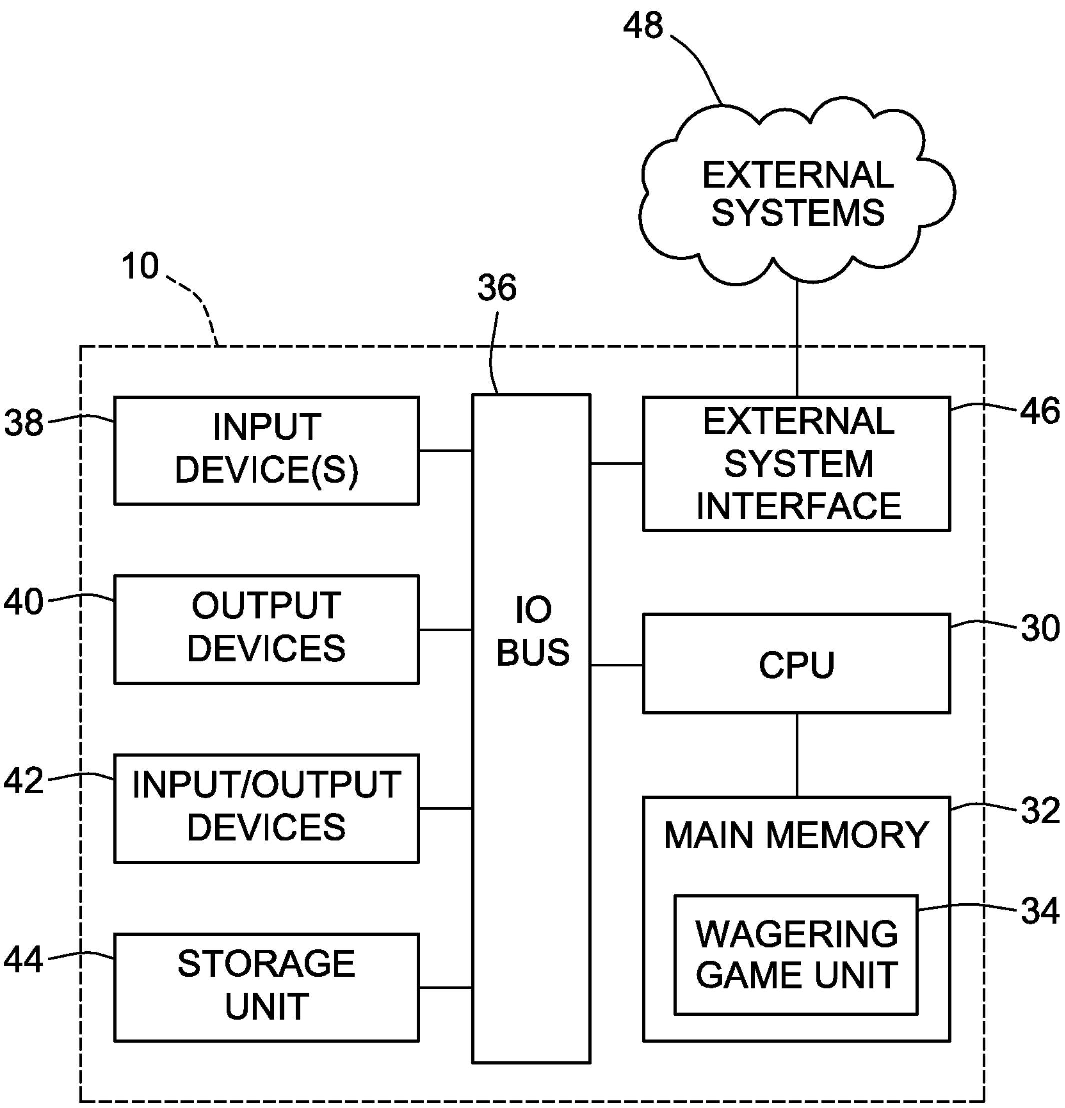
FIG. 2 is a schematic diagram of an example of a gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
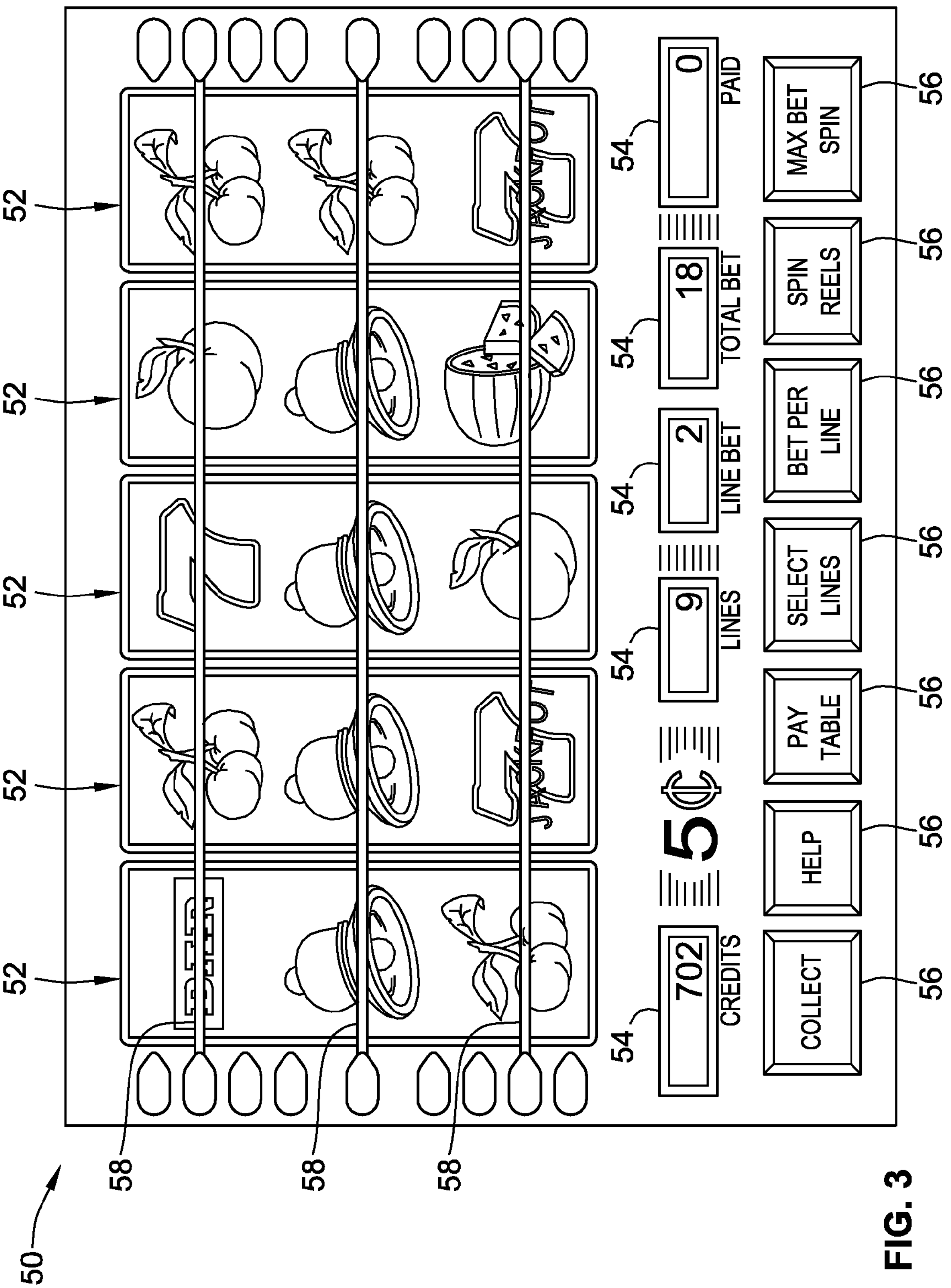
FIG. 3 is a screen shot of an exemplary basic-game screen of a wagering game displayed on a gaming terminal, according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
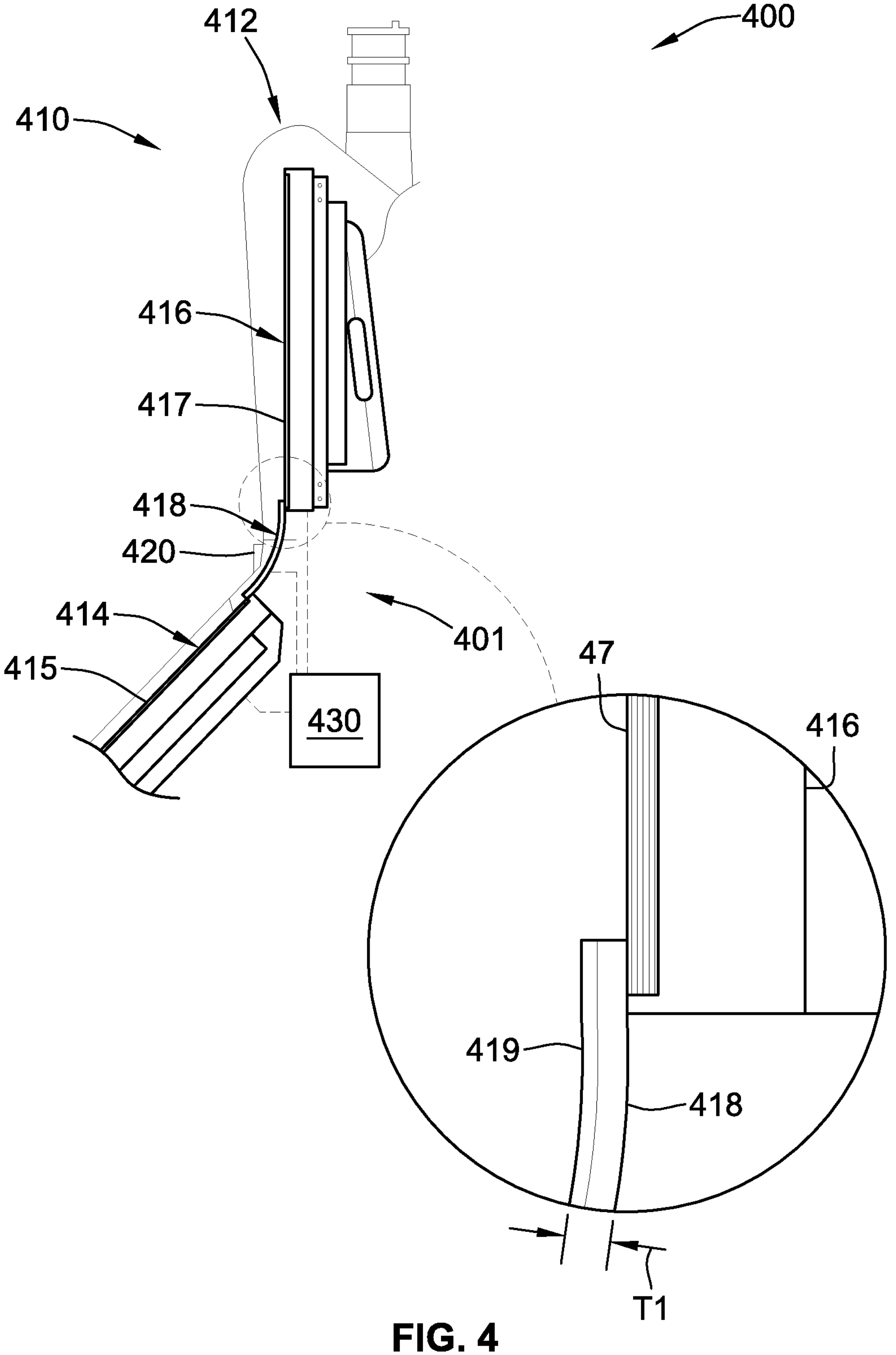
FIG. 4 is a schematic side-view illustration of an example of gaming terminal with a multi-display device arrangement with an electronic display-transition device in accordance with aspects of the present disclosure.

FIG. 4 is a schematic side-view illustration of an exemplary gaming terminal, designated generally at 410, which may be part of a gaming system 400, shown in accordance with aspects of the present disclosure. Although differing in appearance, the gaming terminal 410 can be similar in function, operation and/or connectivity to, and therefore can include any of the features and options of the gaming terminal 10 discussed above with respect to FIGS. 1 and 2. For example, the gaming terminal 410 (also referred to herein as "wagering game machine" or "gaming machine") may be an electromechanical gaming terminal configured, for example, to play mechanical slots, or it may be an electronic gaming terminal configured, for example, to play a video casino game, such as keno, poker, slots, blackjack, roulette, etc. Markedly, the gaming terminal 410 is purely representative in nature, and presented solely for explanatory purposes. As such, the aspects of the present disclosure are not per se limited to the terminal configuration shown in FIG. 4.

The illustrated gaming terminal 410 comprises a cabinet 412 for housing and/or supporting a variety of operational componentry (e.g., one or more processors, such as CPU 30, one or more memory devices, such as memory 32, an external systems interface 46, etc.). For output devices, the gaming terminal 410 includes a primary display area (or "first electronic display device") 414, a secondary display area (or "second electronic display device") 416, and a tertiary display area 418 (or "electronic display-transition device"). For input devices, the gaming terminal 410 of FIG. 4, like the gaming terminal 10 of FIG. 1, may include a bill-receiving and validating device, a coin acceptor, one or more information readers, a button panel, a touch screen, and one or more player-accessible ports (e.g., an audio output jack for headphones, a video headset jack, a wireless transmitter/receiver, etc.). While these typical components found in the gaming terminal 410 are described above, it should be understood that numerous additional/alternative peripheral devices and other elements may exist and may be used in any number of combinations to create various forms of a gaming terminal.

The first display device 414 may include, for example, a mechanical-reel display, a video display, a transmissive display assembly, other known display devices, and combinations thereof. The second display device 416 may display, in some non-limiting examples, information associated with wagering games, non-wagering games, community games, progressives, advertisements, services, premium entertainment, text messaging, emails, alerts or announcements, broadcast information, subscription information, etc. Each of the display devices 414, 416 may take on various forms of electronic displays, including, without limitation, of a cathode ray tube (CRT), a high-resolution liquid crystal display (LCD), a plasma display, a light emitting diode (LED), an electroluminescent (EL) panel, or any other type of display suitable for use in the gaming terminal 410. As seen in FIG. 4, the electronic display devices 414, 416 respectively include a corresponding ("first" or "second") video display screen 415, 417, which is configured to dynamically display aspects of a wagering game (e.g., moving and static text, graphics, images, etc.). The terms "electronic video display screen" and "video display screen" can be interpreted as inclusive of, but not exclusive to, display devices that create visual images, both moving and stationary alike, through the electronic generation and manipulation of light. In the illustrated embodiment, for example, each of the electronic display devices 414, 416 includes a high-resolution LCD panel.

Likewise, the electronic display-transition device 418 includes a ("third") video display screen 419 (see inset view of FIG. 4) configured to dynamically display aspects of a wagering game (e.g., modulated and dynamic lighting, moving and static text, graphics, images, etc.). In the embodiment illustrated in FIG. 4, the electronic display-transition device 418 includes a flexible OLED (organic light-emitting diode) display. One such OLED display panel is the AMOLED screen, which is commercially available from LG Display Co., Ltd., of Seoul, South Korea. In another optional configuration, the display screen 419 may include an organic thin-film transistor (OTFT) display panel, which may be integrated with OLED technology. One such OTFT display is the Rollable OTFT-Driven OLED Panel, which is commercially available from Sony Corp., of Tokyo, Japan. In yet another optional configuration, the display screen 419 includes an LED tube display comprising a plurality of juxtaposed LED tubes. One such LED tube display is the LED Tube Screen, which is commercially available from Zhuhai iTech Electronic Technology Co., Ltd., of Guangdong Province, China.

The first and second electronic display devices 414, 416 are shown mounted side-by-side, in a non-coplanar relationship with one another. For instance, the first electronic display device 414 is mounted in a slanted orientation to the base portion of the cabinet 412, which may be designated as a "first location." The second electronic display device 416, on the other hand, is mounted in a generally vertical orientation to the top-box portion of the cabinet 412, which may be designated as a "second location" that is distinct from the first location. As seen in FIG. 4, the electronic display devices 414, 416 are mounted such that a top side (e.g., the upper edge) of the first electronic display device 414 is adjacent and generally parallel to a bottom side (e.g., the lower edge) of the second electronic display device 416. The second electronic display device 416 is shown mounted at an oblique angle to and spaced from the first electronic display device 414, i.e., across a gap (generally designated as 401 in FIG. 4). In the illustrated embodiment, the first and second electronic display devices 414, 416 are vertically spaced from one another relative to the cabinet 414. However, the relative arrangement of the electronic display devices 414, 416 is not so limiting. For example, the first and second electronic display devices 414, 416 may be horizontally or diagonally spaced from one another relative to the cabinet 414. To this regard, the electronic display devices 414, 416 and the electronic display-transition device 418 each extends transversely with respect to the cabinet 412 in the embodiment shown; nevertheless, it is also within the scope of this disclosure for the electronic devices 414, 416, 418 to extend height-wise with respect to the cabinet 412. Other characteristics, such as the relative angle of orientation, the distance of separation, the respective locations on the cabinet, etc., can be varied from that which is shown in the drawings.

The first and second electronic display devices 414, 416 and the electronic display-transition device 418 are cooperatively configured to appear to a player as a single, elongated display screen. In effect, the electronic display-transition device 418 provides an aesthetically pleasing curved transition zone that eliminates the "dead" space between the two electronic display devices 414, 416 by "visually connecting" the first and second video display screens 415, 417. Unlike purely decorative trim, emotive lighting, and speaker arrangements, which are typically packaged between the primary and secondary display areas, the electronic display-transition device 418 is designed to dynamically display aspects of the wagering game. By providing this additional functionality, aspects of the wagering game being dynamically displayed by the first display device 414 can selectively transition through the display-transition device 418 to the second display device 416, and vice versa. In addition, this multi-display configuration has been found to be more practical and less expensive than a single, elongated and curved display screen (which is heretofore not reasonably commercially available).

Figure 5:
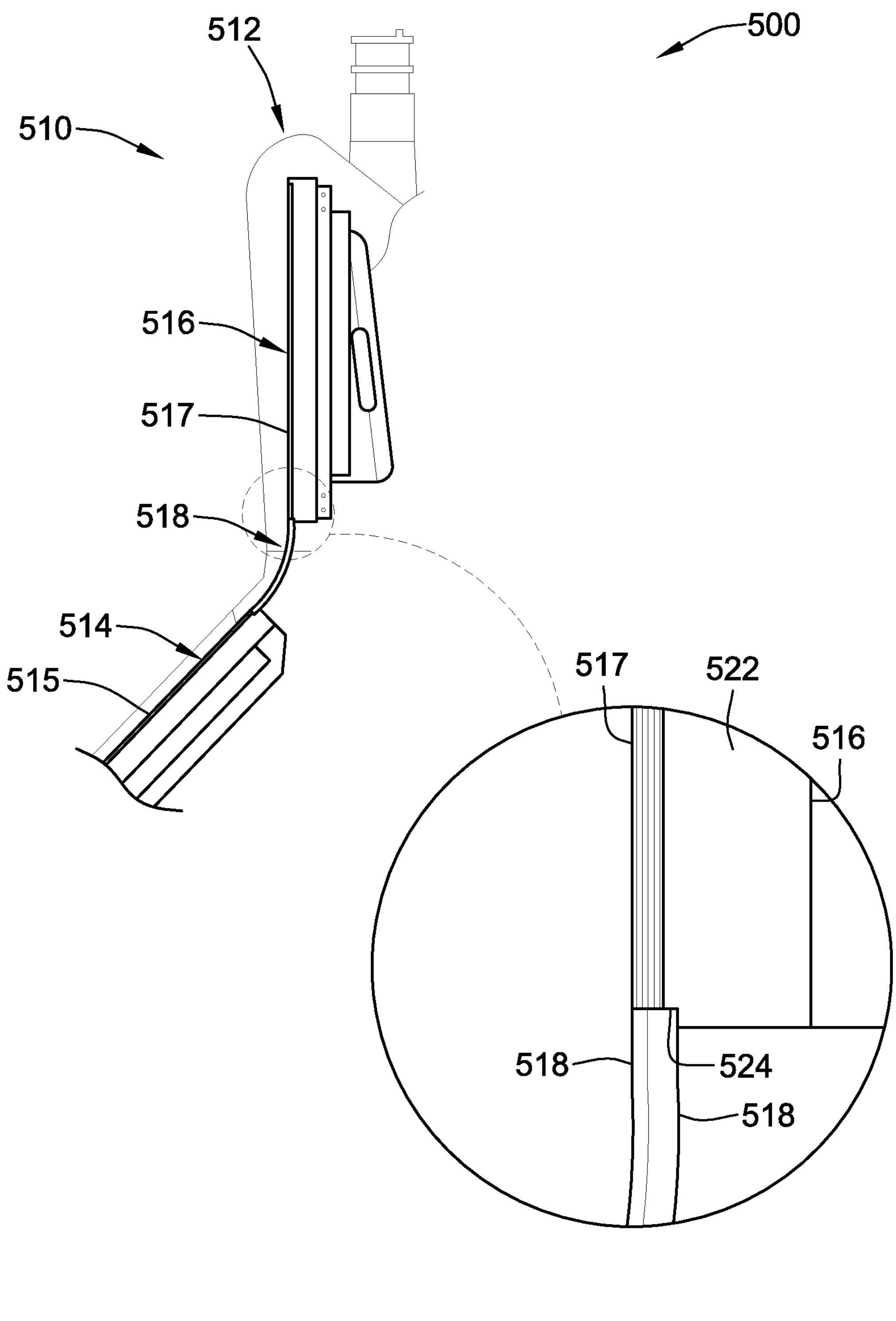
FIG. 5 is a schematic side-view illustration of another exemplary multi-display device arrangement with an electronic display-transition device in accordance with aspects of the present disclosure.

As seen in FIG. 4, for example, the display-transition device 418 extends across the gap 401 from the first electronic display device 414 to the second electronic display device 416 such that the gap 401 is covered or otherwise visually obstructed from the player's view, whom would be positioned in front of the gaming terminal 410 (e.g., to the left in FIG. 4). To create a generally "seamless" transition, the upper portion of the display-transition device 418 of FIG. 4 lies against and at least partially covers the first video display screen 415, whereas a lower portion of the display-transition device 418 lies against and at least partially covers the second video display screen 417 of the second display device 416. Alternatively, as seen in the embodiment of FIG. 5, wherein similar reference numerals refer to similar features from FIG. 4, an outer surface of the display screen 519 of the electronic display-transition device 518 is substantially flush (e.g., even and level) with an outer surface of each of the first and second video display screens 515 and 517 of the first and second electronic display devices 514, 516. To accommodate this feature, the housing 522 of each display device 516 can be provided with a complementary step, recess or other mating feature, generally designated as 524 in FIG. 5, within which can be nested a respective portion of the display-transition device 518.

To achieve the appearance of a single, elongated and curved display, it may be necessary for the first, second and third video display screens 415, 417, 419 to all have approximately the same display resolution—e.g., roughly the same pixel density or number of pixels per unit area, such that the viewer does not readily perceive the movement of objects or other aspects of the wagering game back-and-forth across the display-transition device 418 between the electronic display device 414, 416. In this regard, it may be preferable for the gaming terminal 410 (or gaming system 400) to include a single display controller (shown schematically at 430 in FIG. 4) that is operatively connected to and configured to control all three of the electronic display devices 414, 416, 418. This feature can allow for more synchronous operation of the display devices 414, 416, 418. It may also be desirable, in some embodiments, that the video display screen 419 of the electronic display-transition device 418 be flexible. By way of example, the first and/or second electronic display device 414, 416 can be movably mounted to the cabinet 412 such that the display devices 414, 416 can be adjusted with respect to each other. In this instance, the electronic display-transition device 418 can be sufficiently flexible to bend with the moving first and/or second electronic display device 414, 416 without requiring the display-transition device 418 be first removed or otherwise replaced.

Achieving the appearance of a single, elongated and curved display may also require the display-transition device 418 be sized and shaped, for example, to complement and otherwise accommodate the packaging parameters of the gaming terminal 410. For instance, the first video display screen 415 has a first length (e.g., L1 in FIG. 1) and the second video display screen 417 has a second length (e.g., L2 in FIG. 1). In some embodiments, the first and second lengths L1 and L2 are approximately or substantially equal—e.g., about 51 centimeters (20 inches). The electronic display-transition device 418 has a third length (e.g., L3 in FIG. 6), which is at least approximately equal to, if not longer than, the first and second lengths L1, L2 of the first and second video display screens 415, 417. In some embodiments, the display-transition device 418 is approximately 50.8 centimeters (20.0 inches) long, approximately 2.5-5.1 cm high (1-2 in), and approximately 0.32-0.65 cm (⅛-¼ in) thick. In other embodiments, the electronic display-transition device 418 has a thickness T1 (see inset view of FIG. 4) of approximately 0.32 cm (⅛ in) or less. In addition, to accommodate the angled orientation of the display devices 414, 416, the electronic display-transition device 418 has a curvilinear cross-sectional profile, as seen in FIG. 4. Like the other dimensions disclosed herein (e.g., heights, lengths, widths, offsets, etc.), the radius of curvature of the third video display screen 419 can be varied, for example, to accommodate the specific requirements of a particular application. In applications where the video display screen 419 is flexible, the radius of curvature would be adjustable.

Figure 6:
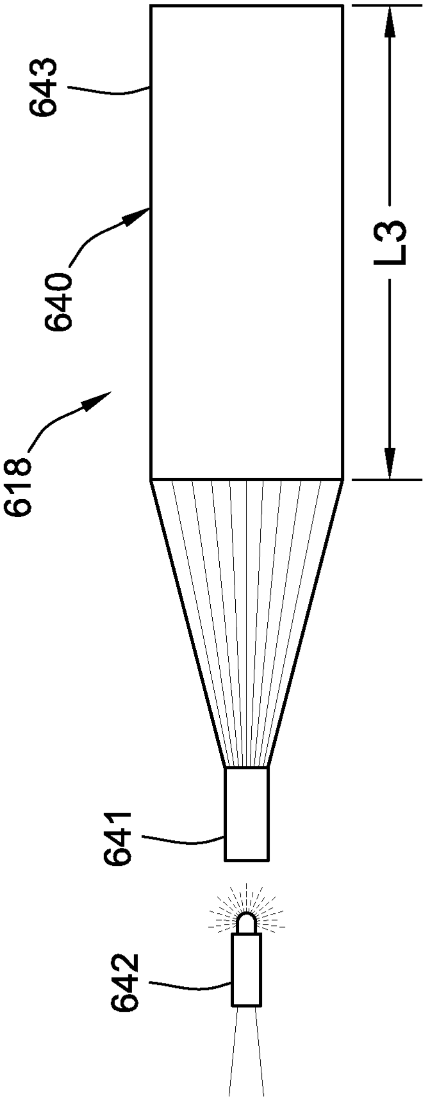
FIG. 6 is a front-view illustration of another electronic display-transition device in accordance with aspects of the present disclosure.

FIG. 6 illustrates another electronic display-transition device 618 in accordance with aspects of the present disclosure. Like the electronic display-transition devices 418 and 518 of FIGS. 4 and 5, respectively, the electronic display-transition device 618 of FIG. 6 is configured to dynamically display aspects of a wagering game (e.g., modulated and dynamic lighting, moving and static images, etc.). Moreover, the electronic display-transition device 618 provides an aesthetically pleasing curved transition zone that eliminates the "dead" space between two or more side-by-side electronic display devices (e.g., display devices 414, 416 of FIG. 4) by "visually connecting" the various display screens. Unless otherwise expressly or logically limited, the electronic display-transition device 618 can include any of the optional features and alternative configurations discussed above with respect to FIGS. 4 and 5.

The display-transition device 618 embodied in FIG. 6 is a fiber-optic-based lighting system that uses, for example, a woven array of optical fibers or other interconnectable optical light guides to deliver uniform light across the transition field. The active illuminated area can be formed into the curved shape of the display-transition device 618. Light, which can be coupled in from any side of the display assembly, can illuminate the entire transition area—i.e., from the very top to the very bottom of the display-transition device 618. As illustrated, the electronic display-transition device 618 includes an elongated sheet of optical fibers 640, which is configured to extend between the adjacent electronic display devices and thereby conceal any underlying gap. The elongated sheet of optical fibers 640 includes a plurality of individual strands of optical fibers. Each of the individual strands of optical fiber may include a light transmitting core of a suitable optically transparent material, such as silica, plastic, or fluorozirconate, fluoroaluminate, and other glass materials. The core can then be enclosed within an optically transparent outer sheath (or "cladding") of a second optically transparent material having a lower index of refraction than the core material to trap light in the core through substantially total internal reflection. The core and cladding may be coated with an optional buffer for protection from moisture and physical damage.

In some embodiments, a first end 641 of the optical fibers 640 is bundled together to form an elongated tail, which may be wrapped in an optional sleeve to maintain the desired shape of the tail and to protect the bundled optical fibers 640. As best seen in FIG. 6, a distal tip of the tail 641 is optically coupled with a light source 642. The light source 642 may take on various suitable forms, such as, for example, halogen, xenon, incandescent, metal-halide, and fluorescent light sources, singularly or in any combination. According to the illustrated embodiment, the light source 642 is a controllable multi-color RGB (red, green, and blue) LED system that is operable to provide variable color and intensity across the entire transition piece. The second end 643 of the optical fibers 640 is juxtaposed and connected together—e.g., placed side-by-side, immediately adjacent one another, in one or more layers, and adhered together to form a curvilinear sheet. The edges of the sheet 643 may be sealed to prevent inadvertent breakage of the individual optical fibers. Light generated by the light source 642 is transmitted along the longitudinal expanse of the optical fibers from the tail 641 to the sheet 643, which radiates light generated by the light source 642 outwardly toward the player.

Figure 7:
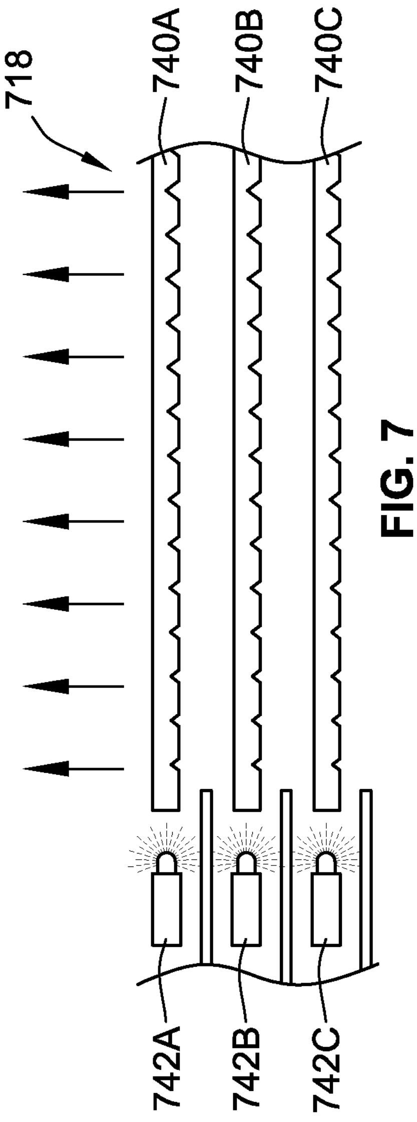
FIG. 7 is a schematic plan-view illustration of yet another electronic display-transition device in accordance with aspects of the present disclosure.

Turning next to FIG. 7, an example of an alternative electronic display-transition device 718 is portrayed in accordance with aspects of the present disclosure. Like the electronic display-transition devices 418, 518, 618 of FIGS. 4-6, the electronic display-transition device 718 of FIG. 7 is configured to dynamically display aspects of a wagering game (e.g., modulated and dynamic lighting, moving and static images, etc.). Likewise, the electronic display-transition device 718 provides an aesthetically pleasing curved transition zone that eliminates the "dead" space between two or more side-by-side electronic display devices (e.g., display devices 414, 416 of FIG. 4) by "visually connecting" the various display screens. Unless otherwise expressly or logically limited, the electronic display-transition device 718 can include any of the optional features and alternative configurations discussed above with respect to FIGS. 4 and 5.

The display-transition device 718 embodied in FIG. 7 is an illuminated diffuser with "striped" color changing lighting. The electronic display-transition device 718 includes a plurality of individual optical fibers or other optical light guides 740A-C, each of which is in optical communication with an individual dedicated light source 724A-C, respectively. Alternatively, the electronic display-transition device 718 may comprise a plurality of grouped/bundled optical fibers, each of which is in optical communication with an individual dedicated light source. The optical fibers 740A-C are operatively connected to form the curved shape of the display-transition device 718, which is configured to extend between the adjacent electronic display devices and thereby conceal any underlying gap. This configuration allows for the graduation of the illumination hue and intensity from the top to the bottom of the display-transition device 718. This configuration can also be used to create a blending effect between the top and bottom displays.

While many preferred embodiments and best modes for carrying out the present invention have been described in detail above, those familiar with the art to which this invention relates will recognize various alternative designs and embodiments for practicing the invention within the scope of the appended claims.

What is claimed is:

1. A gaming system for conducting a wagering game, the gaming system comprising:

at least one input device;

at least one processor;

first and second electronic display devices mounted in side-by-side non-coplanar relationship and spaced a gap apart from each other, the first and second display devices including respective first and second video display screens, the first and second electronic display devices each being configured to dynamically display aspects of the wagering game; and an electronic display-transition device extending across the gap from the first video display screen to the second video display screen, the electronic display-transition device being configured to dynamically display aspects of the wagering game.

2. The gaming system of claim 1, wherein the electronic display-transition device has a curvilinear cross-sectional profile.

3. The gaming system of claim 1, wherein the electronic display-transition device includes a flexible display screen.

4. The gaming system of claim 1, wherein the electronic display-transition device covers at least a portion of each of the first and second video display screens.

5. The gaming system of claim 1, wherein an outer surface of the electronic display-transition device is substantially flush with an outer surface of each of the first and second video display screens.

6. The gaming system of claim 1, wherein the first video display screen has a first length and the second video display screen has a second length, the electronic display-transition device having a third length at least approximately equal to the first and second lengths of the first and second video display screens.

7. The gaming system of claim 1, wherein the electronic display-transition device includes a third video display screen, the first, second and third video display screens all having approximately the same display resolution.

8. The gaming system of claim 1, wherein the electronic display-transition device includes an elongated sheet of optical fibers extending between the first and second electronic display devices.

9. The gaming system of claim 8, wherein the elongated sheet of optical fibers includes a plurality of individual optical fibers with a first end thereof being bundled together to form a tail in optical communication with a light source, and a second end thereof being juxtaposed and connected together to form a curvilinear sheet.

10. The gaming system of claim 1, wherein the electronic display-transition device includes a plurality of individual optical fibers each being in optical communication with a respective one of a plurality of light sources.

11. The gaming system of claim 1, wherein the first and second electronic display devices are movably mounted with respect to each other, and wherein the electronic display-transition device is sufficiently flexible to bend with the first and second electronic display devices when moved.

12. The gaming system of claim 1, wherein the at least one processor includes a display controller operatively connected with and configured to control the first and second electronic display devices and the electronic display-transition device.

13. The gaming system of claim 1, wherein the electronic display-transition device has a thickness of approximately ⅛ inch or less.

14. The gaming system of claim 1, wherein the first and second electronic display devices and the electronic display-transition device are cooperatively configured to appear to a player as a single, elongated display screen.

15. The gaming system of claim 1, wherein the dynamically displayed aspects are received from an adjacent portion of at least one of the first or second display devices.

16. A gaming terminal for playing a wagering game, the gaming terminal comprising:

a cabinet;

a wager input device configured to receive an indication of a wager to play the wagering game;

a player input device configured to receive a player input related to play of the wagering game;

a first electronic display device mounted to the cabinet at a first location, the first electronic display device having a first video display screen configured to dynamically display aspects of the wagering game;

a second electronic display device mounted to the cabinet at a second location and at an oblique angle to and spaced a gap apart from the first electronic display device, the second electronic display device having a second video display screen configured to dynamically display aspects of the wagering game; and an electronic display-transition device covering and extending across the gap from the first electronic display device to the second electronic display device, the electronic display-transition device having a curvilinear third video display screen configured to dynamically display aspects of the wagering game.

17. The gaming terminal of claim 16, wherein the electronic display-transition device covers at least a portion of each of the first and second video display screens.

18. The gaming terminal of claim 16, wherein an outer surface of the third video display screen of the electronic display-transition device is substantially flush with an outer surface of each of the first and second video display screens.

19. The gaming terminal of claim 16, wherein the first and second electronic display devices are movably mounted with respect to each other, and wherein the electronic display-transition device is sufficiently flexible to bend with the first and second electronic display devices when moved.

20. The gaming terminal of claim 16, wherein the dynamically displayed aspects are received from an adjacent portion of at least one of the first or second display devices.

21. A multi-display arrangement for a wagering game terminal with a cabinet, the multi-display arrangement comprising:

a first electronic display device configured to mount to the cabinet at a first location, the first electronic display device having a first video display screen configured to dynamically display aspects of a wagering game;

a second electronic display device configured to mount to the cabinet in a generally vertical orientation at a second location and at an oblique angle to and vertically spaced a gap apart from the first electronic display device, the second electronic display device having a second video display screen configured to dynamically display aspects of the wagering game; and an electronic display-transition device covering and extending across the gap between the first and second electronic display devices, the electronic display-transition device having a curvilinear display screen configured to dynamically display aspects of the wagering game.

22. The multi-display arrangement of claim 21, wherein the dynamically displayed aspects are received from an adjacent portion of at least one of the first or second display devices.

23. A gaming system comprising:

at least one input device configured to receive an indication of a wager to play a wagering game;

at least one processor;

at least one memory device storing instructions which, when executed by the at least one processor, cause the gaming system to execute a wagering game;

a primary electronic display device with a first video display screen configured to dynamically display aspects of the executed wagering game;

a secondary electronic display device with a second video display screen configured to dynamically display aspects of the executed wagering game, the first and second electronic display devices being mounted in side-by-side non-coplanar relationship and spaced a gap apart from each other; and a tertiary electronic display device extending across the gap from the primary electronic display device to the secondary electronic display device, the tertiary electronic display device being configured to dynamically display aspects of the wagering game and visually connect the first and second video display screens, wherein the primary electronic display device, the secondary electronic display device, and the tertiary electronic display device are cooperatively configured to appear to a player as a single, elongated display screen.

24. The gaming system of claim 23, wherein the tertiary electronic display device has a curvilinear display screen.

25. The gaming system of claim 23, wherein the tertiary electronic display includes a third video display screen, an outer surface of the third video display screen being substantially flush with respective outer surfaces of the first and second video display screens.

26. The gaming system of claim 23, wherein the tertiary electronic display device covers at least a portion of each of the first and second video display screens.

27. The gaming system of claim 23, wherein the at least one processor includes a display controller operatively connected with and configured to control the primary, secondary, and tertiary electronic display devices.

28. The gaming system of claim 23, wherein the dynamically displayed aspects are received from an adjacent portion of at least one of the first or second display devices.

* * * * *